US012645430B2

(12) United States Patent
Hann et al.

(10) Patent No.: US 12,645,430 B2
(45) Date of Patent: Jun. 2, 2026

(54) QUANTUM SOURCE CODING WITH A QUANTUM SORTING NETWORK

(71) Applicants: THE UNIVERSITY OF CHICAGO, Chicago, IL (US); MASSACHUSETTS INSTITUTE OF TECHNOLOGY, Cambridge, MA (US)

(72) Inventors: Connor Hann, New Haven, CT (US); Liang Jiang, Chicago, IL (US); Isaac Chuang, Cambridge, MA (US); Senrui Chen, Guizhou (CN)

(73) Assignees: THE UNIVERSITY OF CHICAGO, Chicago, IL (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 285 days.

(21) Appl. No.: 18/684,918

(22) PCT Filed: Aug. 19, 2022

(86) PCT No.: PCT/US2022/040936
§ 371 (c)(1),
(2) Date: Feb. 20, 2024

(87) PCT Pub. No.: WO2023/023358
PCT Pub. Date: Feb. 23, 2023

(65) Prior Publication Data
US 2024/0354066 A1 Oct. 24, 2024

Related U.S. Application Data

(60) Provisional application No. 63/235,265, filed on Aug. 20, 2021.

(51) Int. Cl.
*G06F 8/30* (2018.01)

(52) U.S. Cl.
CPC ..................................... *G06F 8/30* (2013.01)

(58) Field of Classification Search
CPC .......................................................... G06F 8/30
See application file for complete search history.

(56) References Cited

U.S. PATENT DOCUMENTS

2010/0299526 A1 11/2010 Wiseman et al.
2012/0155870 A1 6/2012 Harrison et al.
(Continued)

FOREIGN PATENT DOCUMENTS

WO WO-2021055000 A1 * 3/2021 ............. G06N 10/60

OTHER PUBLICATIONS

International Search Report and Written Opinion in corresponding International Patent Application No. PCT/US2022/040936, mailed Nov. 17, 2022, 6 pages.
(Continued)

*Primary Examiner* — Jae U Jeon
(74) *Attorney, Agent, or Firm* — Cozen O'Connor

(57) ABSTRACT

A quantum source coding method includes: initializing a quantum register having a plurality of nodes: loading a unary-coded message into the quantum register; loading an address state into an address register of each message node of the quantum register; sorting the message nodes based on a data register such that the message nodes form a message-sorted sequence; and applying, for each message node at an end of the message-sorted sequence, a CNOT gate to the address state of each of the register's message nodes and output nodes. The method also includes: unsorting the message nodes; sorting the nodes based on the address register such that the nodes form a fully-sorted sequence; applying, for each pair of adjacent nodes in the fully-sorted sequence having the same address state, a CNOT gate to the
(Continued)

data registers of each pair; and unsorting the nodes to return the fully-sorted sequence to the initial sequence.

20 Claims, 7 Drawing Sheets

(56) References Cited

U.S. PATENT DOCUMENTS

| | | | |
|---|---|---|---|
| 2018/0039903 A1* | 2/2018 | Mosca ................... | B82Y 10/00 |
| 2018/0181685 A1* | 6/2018 | Roetteler .............. | H04L 9/0643 |
| 2021/0133614 A1* | 5/2021 | Ashrafi ..................... | G02F 3/00 |
| 2021/0167799 A1* | 6/2021 | Boutillon .......... | H03M 13/6591 |
| 2021/0374594 A1 | 12/2021 | Langer et al. | |

OTHER PUBLICATIONS

Beals et al., Efficient distributed quantum computing, Proceedings of the Royal Society A, vol. 469, Issue 2153, pp. 1-20, Published May 8, 2013.

Langford, Generic Quantum Block Compression, arXiv:quant-ph/0109074, Sep. 17, 2001, 7 pages.

Braunstein et al., A Quantum Analog of Huffman Coding, IEEE Transactions on Information Theory, vol. 46, No. 4, Jul. 2000, pp. 1644-1649.

Cheng et al., Quantum Switching and Quantum Merge Sorting, IEEE Transactions on Circuits and Systems I: Regular Papers, vol. 53, No. 2, pp. 316-325, Feb. 2006.

Schumacher et al., Indeterminate-Length Quantum Coding, arXiv:quant-ph/0011014, Nov. 2, 2000, 32 pages.

Bostroem et al., Lossless quantum data compression and variable-length coding, arXiv:quant-ph/0105026, Mar. 1, 2022, 16 pages.

* cited by examiner

100

110 depth = polylog (N)

Quantum sorting network 460

N-node quantum processor (a)

Noise resilient quantum sorting

Efficient quantum source coding

Near-instantaneous quantum source coding (b)

Input nodes | Output nodes

Data | 0 | 0 | 1 | 0 | 0 | 0 | 1 | 0 | 1 | 1
Address | 0 | 1 | 2 | 3 | 4 | 5 | 6 | 7 | 0 | 0

QUANTUM SOURCE CODING WITH A QUANTUM SORTING NETWORK

RELATED APPLICATIONS

This application is a 35 U.S.C. § 371 filing of International Application No. PCT/US2022/040936, filed on Aug. 19, 2022, which claims priority to U.S. Provisional Patent Application No. 63/235,265, filed on Aug. 20, 2021. Each of these applications is incorporated herein by reference in its entirety.

STATEMENT REGARDING FEDERALLY SPONSORED RESEARCH OR DEVELOPMENT

This invention was made with government support under grant numbers W911NF-16-1-0349, W911NF-18-1-0020, and W911NF-18-1-0212 awarded by the Army Research Office, grant numbers EFMA1640959, OMA1936118, and EEC1941583 awarded by the National Science Foundation, and grant numbers FA9550-19-1-0399 and FA9550-21-1-0209 awarded by the Air Force Office of Scientific Research. The government has certain rights in the invention.

BACKGROUND

Classical data compression is a crucial part of our modern digital infrastructure. For example, compression protocols enable the efficient storage and transmission of images, audio files, and videos. Similarly, quantum data compression is likely to be a crucial part of our future quantum infrastructure, where quantum compression algorithms will enable more efficient storage and transmission of quantum data. However, existing algorithms for quantum data compression tend to involve complex operations and large-volume circuits, necessitating large fault-tolerant quantum computers for their implementation.

SUMMARY

Embodiments herein include quantum source coding methods that improve the practicality of quantum compression, i.e., how to compress quantum data using simpler operations with fewer qubits, noisier qubits, or both. Certain embodiments pertain to the task of source coding.

Data compression via classical source coding is a crucial part of our modern digital infrastructure. Despite the fact that analogous quantum source coding protocols have been developed for quantum data compression, severe practical challenges have thus far prevented their implementation.

Existing quantum source coding schemes face several challenges. The first challenge is that the coding schemes typically involve complex operations and deep circuits that are out of reach for near-term devices. The second challenge is that compiling these schemes to general-purpose quantum computing architectures can lead to significant additional overheads and slowdowns that further complicate the implementation. Embodiments disclosed herein address each of these challenges, and significantly improve the viability of quantum source coding in the near- and long-term.

To address the first challenge, we show that our protocols based on quantum sorting networks are naturally resilient to certain kinds of noise, which can significantly reduce the extent of quantum error correction required to reach a target error rate.

To address the second challenge, we propose a specialized class of architectures and accompanying algorithms for universal quantum source coding. Our architectures/algorithms are based on quantum sorting networks and are appealing because they have logarithmic running time and can be easily implemented in a distributed fashion.

Potential applications of disclosed architectures include quantum communication, sensing (telescopes), state preparation (Hamiltonian simulation), and tomography.

In a first aspect, a first quantum source coding method is disclosed. The first method includes initializing a quantum register having a plurality of nodes. Each of the plurality of nodes includes a data register and an address register. Each of the data register and address register has one or more qubits. The plurality of nodes is coupled to each other to support a reversible quantum sorting network. The plurality of nodes is partitioned into message nodes and output nodes. Said initializing includes (i) initializing each of the one or more qubits of the data register of each of the message nodes to a first computational basis state and (ii) initializing each of the one or more qubits of the data register of each of the output nodes to a second computational basis state that is orthogonal to the first computational basis state.

The first method also includes loading a unary-coded message into the quantum register. The unary-coded message includes an input sequence of symbols, each symbol of the input sequence is a two-dimensional quantum state. Said loading comprises storing each symbol in the data register of a respective one of the message nodes.

The first method also includes loading an address state, a first sorting step, applying a controlled-NOT (CNOT) gate, a first unsorting step, a second sorting step, applying a CNOT gate, and a second unsorting step. Loading an address state includes loading the address state into the address register of each of the message nodes. The address state indexes each symbol such that the message nodes form an initial sequence in one-to-one correspondence with the input sequence. The first sorting step includes sorting, with the reversible quantum sorting network, the message nodes based on the data register such that the message nodes form a message-sorted sequence. Applying a CNOT gate includes applying, for each message node of one or more of the message nodes located at an end of the message-sorted sequence, a CNOT gate to the address state of said each message node and the address state of a respective one of the output nodes. The first unsorting step includes unsorting, with the reversible quantum sorting network, the message nodes to return the message-sorted sequence to the initial sequence.

The second sorting step includes sorting, with the reversible quantum sorting network, the plurality of nodes based on the address register such that the plurality of nodes forms a fully-sorted sequence. Applying a CNOT gate includes applying, for each pair of adjacent nodes in the fully-sorted sequence having the same address state, a CNOT gate to the data registers of said each pair. The second unsorting step includes unsorting, with the reversible quantum sorting network, the plurality of nodes to return the fully-sorted sequence to the initial sequence. The address registers of the output states, after said unsorting the plurality of nodes, store a binary-coded message corresponding to the unary-coded message.

In a second aspect, a second quantum source coding method is disclosed. The second method includes initializing a quantum register having a plurality of nodes. Each of the plurality of nodes includes a data register and an address register. Each of the data register and address register has one or more qubits. The plurality of nodes is coupled to each other to support a reversible quantum sorting network. The plurality of nodes is partitioned into input nodes and message nodes. Said initializing includes (i) initializing each of the one or more qubits of the data register of each of the message nodes to a first computational basis state and (ii) initializing each of the one or more qubits of the data register of each of the output nodes to a second computational basis state that is orthogonal to the first computational basis state.

The second method also includes loading a binary-coded message into the quantum register. The binary-coded message includes an input sequence of binary-coded address states. Said loading includes loading each binary-coded address state of the input sequence into the address register of a respective one of the input nodes. The second method also includes loading an address state, a first sorting step, a first applying step, a first unsorting step, a second sorting step, a second applying step, and a second and a second unsorting step.

Loading the address state includes loading the address state into the address register of each of the message nodes. The address state indexes said each of the message nodes such that the message nodes form an initial sequence. The first sorting step includes sorting, with the reversible quantum sorting network, the plurality of nodes based on the address register such that the plurality of nodes forms a fully-sorted sequence. The first applying step includes applying, for each pair of adjacent nodes in the fully-sorted sequence having the same address state, a CNOT gate to the data registers of said each pair. The first unsorting step includes unsorting, with the reversible quantum sorting network, the plurality of nodes to return the fully-sorted sequence to the initial sequence.

The second sorting step includes sorting, with the reversible quantum sorting network, the message nodes based on the data register such that the message nodes form a message-sorted sequence. The second applying step includes applying, for each message node of one or more of the message nodes located at an end of the message-sorted sequence, a CNOT gate to the address state of said each message node and the address state of a respective one of the input nodes. The second unsorting step includes unsorting, with the reversible quantum sorting network, the message nodes to return the message-sorted sequence to the initial sequence. The data registers of the message nodes, after said unsorting the message nodes, store a unary-coded message correspond to the binary-coded message.

In a third aspect, a third quantum source coding method is disclosed. The third method includes initializing a quantum register having a plurality of nodes partitioned into codeword blocks having an identical number of the plurality of nodes. Each of the plurality of nodes includes a data register, a length register, and an address register. Each of the data register, length register, and address register have one or more qubits. The data registers of the plurality of nodes in each codeword block, of the plurality of codeword blocks, form a data sub-block. The length registers of the plurality of nodes in each codeword block form a length sub-block. The address registers of the plurality of nodes in each codeword block form an address sub-block. The plurality of nodes is coupled to each other to support a reversible quantum sorting network.

The third method also includes loading a message into the quantum register. The message includes an input sequence of symbols. Each symbol of the input sequence is a quantum state in d≥2 dimensions. Loading the message includes: (a) performing, with the reversible quantum sorting network, a parallel query of a codebook to retrieve a codeword state and a binary-coded length state corresponding to each symbol, each of the codeword state and the binary-coded length state is disentangled from said each symbol: (b) loading the codeword state into the data sub-block of a respective one of the codeword blocks: (c) formatting the binary-coded length state into a unary-coded length state: and (d) loading the unary-coded length state into the length sub-block of the respective one of the codeword blocks.

The third method also includes steps of loading, sorting, and unsorting. Loading includes loading an address state into the address register of each node of the plurality of nodes. The address state indexes said each node such that the plurality of nodes form an initial-node sequence.

Sorting includes sorting, with the reversible quantum sorting network, the plurality of nodes into a sorted-node sequence. The first level of said sorting is based on the length registers and a second level of said sorting is based on the address registers. Unsorting includes unsorting, with the reversible quantum sorting network, the address registers and the length registers such that the address registers and the length registers are ordered according to the initial-node sequence while the data registers remain ordered according to the sorted-node sequence. After said unsorting (i) the data registers store a sequence of compressed codeword states followed by a sequence of padding states and (ii) the length registers store a sequence of unary-coded length states.

BRIEF DESCRIPTION OF THE FIGURES

FIG. 5 is a schematic of a unary-to-binary coding algorithm, in an embodiment.

Figure 1:
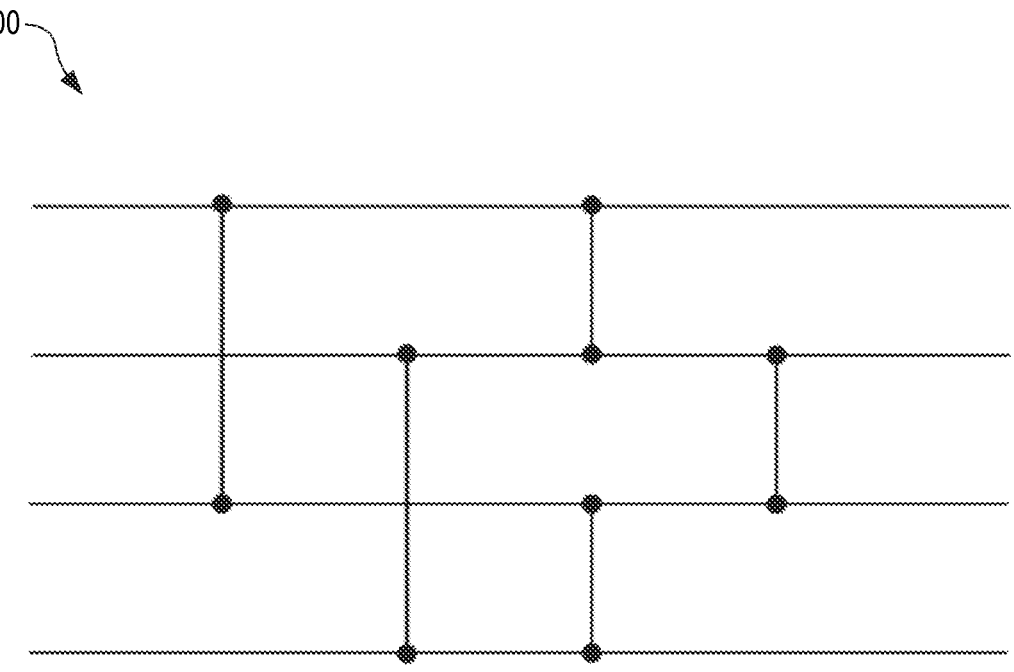
FIG. 1 illustrates an example of a sorting network for a length-four list.
Figure 1:
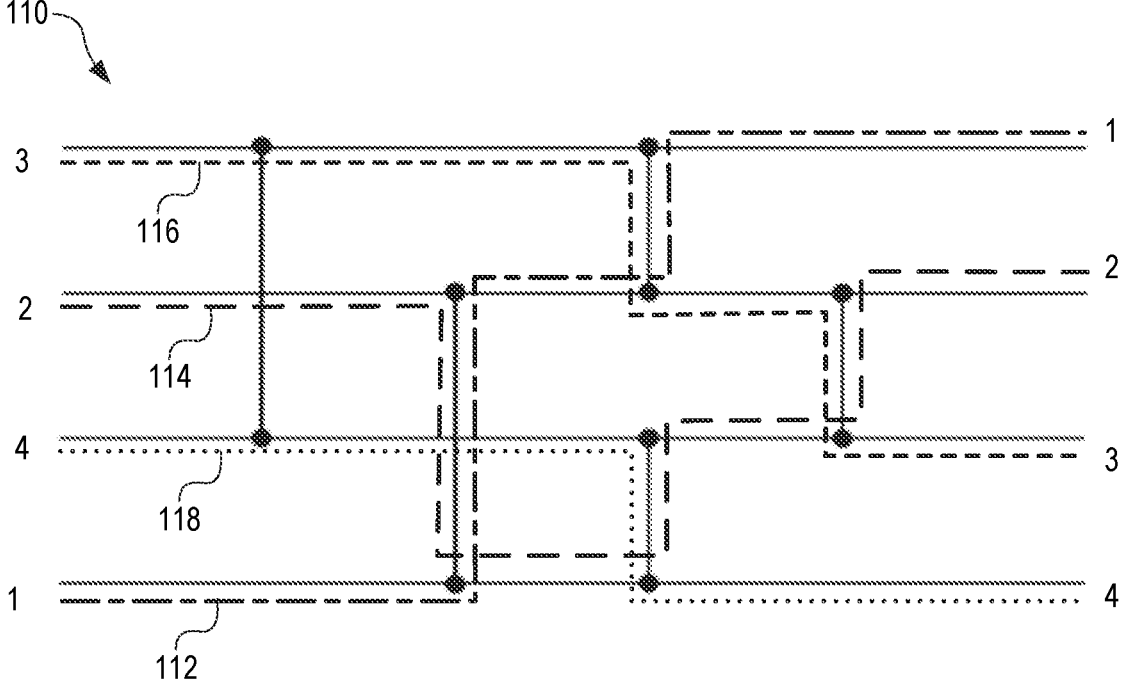

DETAILED DESCRIPTION 1.1 Preliminaries
1.1.1 Classical Source Coding

Suppose a classical source X emits symbols x according to a probability distribution $p_X(x)$. We seek to compress a collection of N symbols (called a message, and denoted generically by $x^N$) into as few bits as possible while preserving the information content of the message (lossless coding). The ultimate limit for such compression is given by Shannon's source coding theorem, which informally states that such a message can be compressed into NH(X) bits with negligible loss of information as N→∞, but compression into fewer bits guarantees information loss in the same limit. Here, $$H(X) = \sum_i p_X(x_i) \log p_X(x_i) \tag{1}$$

is the Shannon entropy.

That the entropy is an achievable compression rate can be proven by partitioning all possible messages into two sets: typical and atypical. The typical set $T_\delta$ is defined to be those messages for which the sample entropy, $$\bar{H}(x^N) = -\frac{1}{N}\log p_{X^N}(X^N) \qquad (2)$$

is $\delta$-close to the source entropy, $$T_\delta = \left\{ x^N : \left| \bar{H}(x^N) - H(X) \right| < \delta \right\}. \qquad (3)$$

All other messages fall in the atypical set. One can show that, in the limit $N \to \infty$, the probability that a message is typical approaches 1 and that the number of typical messages is bounded by $$|T_\delta| \le 2^{N(H(X)+\delta)}. \qquad (4)$$

Together, these facts furnish a compression protocol: encode each typical message as a sequence of $N(H(X)+\delta)$ bits, and throw an error if any atypical message is encountered. As desired, the error probability vanishes for large N, and the compression rate approaches $H(X)$.

Many different compression protocols achieve compression rates approaching the entropy. These include Huffman coding, Shannon-Fano coding, Lempel-Ziv coding, enumerative coding, and arithmetic coding. Of particular interest here are variable-length codes, where each symbol $x_i$ is encoded into some fixed bit string called a code word, but the code words corresponding to different symbols do not generally have the same length. Compression is achieved by encoding more probable symbols into shorter code words. Optimal compression rates are obtained by choosing the length $L_i$ of $x_i$'s code word to be $L_i = \lceil -\log p_X(_i) \rceil$. With this choice, the expected length $\bar{L}$ of an encoded symbol can be bounded as $$H(X) \le \bar{L} \le H(X) + 1, \qquad (5)$$

i.e., within 1 bit of the fundamental limit.

1.1.1 Quantum Source Coding

Suppose a quantum source $\tau$ emits quantum states $|\psi_y\rangle$ according to a probability distribution $p_Y(y)$. The states $|\psi_y\rangle$ need not be mutually orthogonal. The density operator describing the source is $$\rho = \sum_y p_Y(y) |\psi_y\rangle\langle\psi_y|. \qquad (6)$$

This operator can be diagonalized as $$\rho = \sum_x p_X(x) |\psi_x\rangle\langle\psi_x|, \qquad (7)$$

where $|\psi_x\rangle$ are the mutually orthogonal eigenstates of $\rho$ and $p_X(x)$ are the eigenvalues. Note that the Von Neumann entropy of the source, $S(\rho) = -\mathrm{tr}(\rho \log \rho)$, is equal to the Shannon entropy of the eigenvalue distribution, $$S(\rho) = H(X). \qquad (8)$$

We seek to compress a message of N quantum states into as few qubits as possible while preserving the information content of the message. Analogously to the classical case, the ultimate limit for such compression is given by Schumacher's source coding theorem, which informally states that such a message can be compressed into $NS(\rho) = NH(X)$ qubit with negligible loss of information as $N \to \infty$, but compression into fewer qubits guarantees information loss in the same limit. The proof of achievability proceeds by analogously defining a typical subspace, spanned by the joint eigenstates of $\rho^{\otimes N}$ that correspond to classical typical sequences.

Numerous quantum source coding protocols have been developed that have compression rates approaching the Von Neumann entropy [2, 3, 4, 5, 6, 7, 8]. These protocols typically involve constructing reversible implementations of corresponding classical protocols. For example, quantum versions of enumerative coding [3], Huffman coding [4], arithmetic coding [5], and Lempel-Ziv coding [8] have been proposed. More generally, Ref. [9] describes how any classical block coding scheme with compression rate approaching the Shannon entropy can be compiled into a corresponding quantum algorithm with compression rate approaching the Von Neumann entropy.

Unfortunately, for several reasons these existing quantum source coding protocols lie well beyond the capabilities of near-term quantum devices: First, such protocols typically rely on performing complex arithmetic operations that are out of reach near-term quantum devices. Second, compiling these protocols to general-purpose quantum computing architectures can lead to significant additional overheads. Third, all quantum coding schemes are block-coding schemes, which require many qubits to achieve lossless compression at near-optimal rates. Embodiments disclosed herein address these practical challenges so that quantum source coding can be more readily implemented in the near term.

2. Quantum Sorting Network Architectures

In this section we describe a class of quantum computing architectures based on quantum sorting networks (QSNs). The architectures are particularly appealing for near-term implementation because they avoid large overheads typically associated with compiling coding algorithms to more general-purpose quantum computing architectures. Furthermore, the architectures can easily be implemented across separate modules in a distributed fashion. Section 3 presents various sourcing coding protocols, which (i) are specifically tailored to these architectures and (ii) can be implemented in logarithmic depth. We begin by first reviewing classical and quantum sorting networks, then we describe embodiments of QSN-based quantum-computing architectures.

2.1 Classical Sorting Networks

A comparator is a classical gate that takes two inputs, compares them, and swaps them based on the outcome of the comparison. For example, a comparator can take two binary strings as input, compare their values, then order the strings lexicographically.

A classical sorting network is a circuit composed exclusively of comparators. Comparators are applied to the different elements of an input list in a predetermined order such that the output list is sorted according to the comparison criterion. FIG. 1 shows an example of a sorting network 100 for a length-four list. The classical sorting network of FIG. 1 includes four wires. Each gate is a comparator that moves the larger value to its bottom output, as shown in schematic 110. The depth of this network is three.

The depth of a sorting network is defined as the number of time steps required to execute the sort, assuming each comparator takes one time step and that comparators acting on disjoint inputs can be applied in parallel. We are interested in sorting networks whose depth is polylogarithmic in the input size N. For example, bitronic and pairwise sorting networks both have depth $O(\log^2 N)$. There also exist sorting networks with depth $O(\log N)$, but for these networks the big-O notation hides a large constant factor that prohibits their practical use.

2.2 Quantum Sorting Networks

Classical sorting networks can be generalized to quantum sorting networks by generalizing the notion of a comparator [10, 11, 12]. Because the operation of a classical comparator is not reversible, quantum comparator circuits disclosed herein may include an additional bit to make the operation reversible. In a reversible comparator, this bit is set to 1 if the inputs are swapped, and is left as 0 otherwise.

Figures 2, 3:
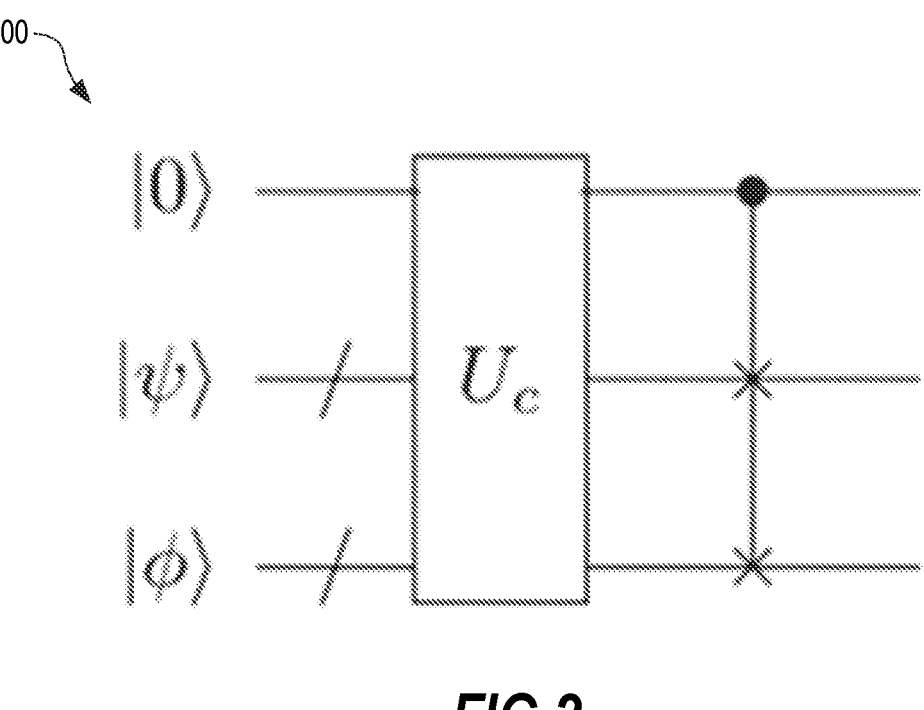
FIG. 2 is a schematic of a generic quantum comparator circuit.
FIG. 3 shows a quantum comparator circuit for comparing two qubits.

FIG. 2 is a schematic of a generic quantum comparator circuit 200. In the comparator circuit 200, the lower two registers are the ones to be sorted, while the top rail is an ancillary qubit that determines whether the swap happens. $U_c$ is a comparison unitary—it acts trivially on the lower two registers, but can flip the ancilla depending on the comparison of $|\psi\rangle$ and $|\phi\rangle$.

In the circuits below, $U_c$ is a unitary operation that checks which of two binary strings is larger and stores the result in the ancilla. In embodiments, such a circuit is constructed from only Toffoli gates, and it requires $O(b)$ qubits and depth $\log(b)$ to compare two strings of length b. FIG. 3 shows a quantum comparator circuit for the simplest case of b=1. Here, $U_c$ reduces to a single CNOT gate.

QSNs may be constructed by taking a classical sorting network and replacing all classical comparators with quantum ones. Such networks sort states in the computational basis. For example, $$S|00\rangle_0|10\rangle_1|11\rangle_2|01\rangle_3 \otimes |0\rangle_4 = |00\rangle_0|01\rangle_1|10\rangle_2|11\rangle_3 \otimes |\sigma\rangle_4, \qquad (9)$$

where S is a QSN circuit. In this example, the first four registers are the inputs to the network, while A contains the ancillas affiliated with the quantum comparators.

2.3 QSN Architectures

Figure 4:
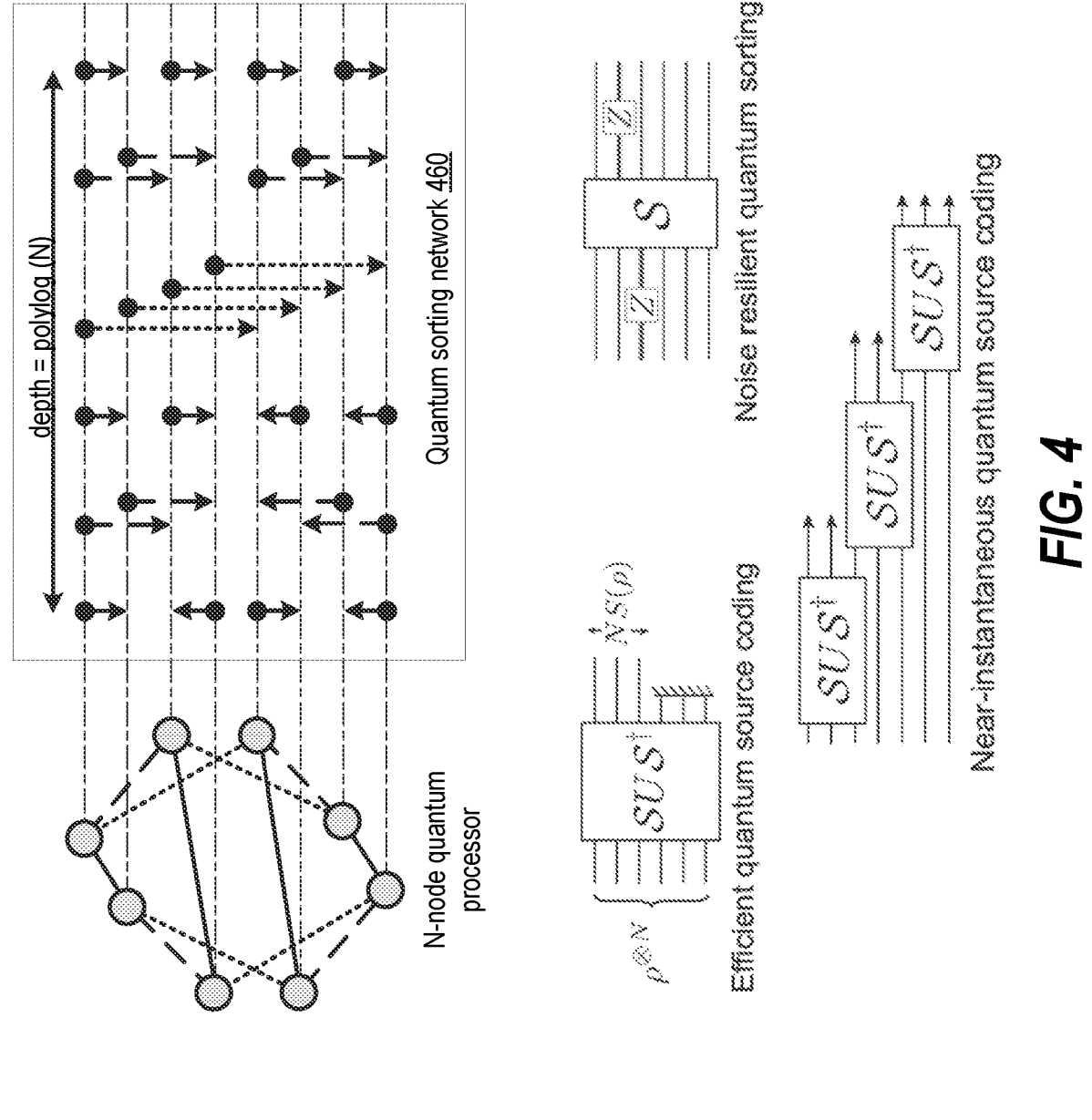
FIG. 4 shows schematics of quantum-sorting-network architectures and applications, in embodiments.

FIG. 4 shows schematics quantum-sorting-network (QSN) architectures and applications. We consider N-node distributed quantum processors with sufficient connectivity to support a quantum sorting network 460, as illustrated in panel (a) of FIG. 4. Several applications of the architecture (discussed below) are shown schematically in panel (b) of FIG. 4. These architectures are practically appealing because they may be implemented in a distributed fashion, they support sorting as a native operation, and (with sufficient connectivity) they can perform sorts in logarithmic depth.

Consider a distributed quantum processor with N nodes, where each node includes polylog(N) qubits, shown in panel (a) of FIG. 4. The connectivity of the processor is described by a graph G (with N vertices, each corresponding to a node) with sufficient connectivity to support a sorting network. In this example, processor is equipped with certain native operations. In particular, reversible classical gates (NOT, CNOT, Toffoli, etc.) can be applied within nodes and between adjacent nodes in constant depth. In certain coding applications, that global single-qubit operations (of the form $U^{\otimes N}$ for arbitrary single-qubit U) may be applied to corresponding qubits in each of the N nodes. The set of reversible classical gates and global single-qubit operations is universal.

Sorting is effectively a native operation for such architectures because quantum comparators can be explicitly implemented using the classical gates, and because G supports a sorting network by construction. The depth of the sorting network, $D_G$, depends on G, with higher connectivity graphs allowing for faster sorting networks. A fully-connected graph, for example, supports sorting networks with depth $D_G=O(\log N)$. However, full connectivity could be challenging to achieve in large, distributed quantum processors. For this reason, an appealing alternative choice for G is a hypercubic graph, which offers an attractive compromise between circuit depth and connectivity. In a hypercubic graph, each node is connected to only log N others, yet this graph supports a bitronic sorting network with $D_G=O(\log^2 N)$–depth. Importantly, embodiments of the coding protocols we describe below may be applied to any graph supporting a sorting network, with the circuit depths of the protocols scaling as $O(D_G)$. That said, we will focus on Graphs with $D_G$=polylog N since the resulting polylogarithmic-depth protocols are most appealing for near-term applications.

3. Source Coding with QSNs

In this section, we present various embodiments of source coding algorithms based on QSNs. In addition to the practical advantages of the QSN architectures described above, these accompanying algorithms provide a further practical advantage: with suitable connectivity, the coding protocols may be implemented with circuits whose depth scales only logarithmically with the size of the message. These short-depth protocols are particularly appealing for noisy, near-term devices.

3.1 Example: Unary-to-Binary Coding

We begin first by providing a simple example of a QSN-based coding scheme. These simplicity of these coding schemes makes them appealing for near-term implementation, but this simplicity comes at the price of non-optimal compression rates. We present schemes with optimal compression rates (approaching the Von Neumann entropy) in later sections. We first describe our coding scheme in the abstract, then discuss its implementation with QSNs.

3.1.1 Coding Schemes

Consider a quantum source p that emits two-dimensional quantum states $|\psi_y\rangle \in \mathbb{C}^2$ according to the probability distribution $p_y(y)$. The source can be diagonalized as $$\rho = (1 - p)|0\rangle\langle 0| + p|1\rangle\langle 1|, \qquad (10)$$

where $|0\rangle$ and $|1\rangle$ denote the eigenstates of $\rho$ and by convention $p \leq \frac{1}{2}$. Messages emitted from $\rho$ can thus be thought of as being composed of strings of $|0\rangle$'s and $|1\rangle$'s, appearing with probabilities $(1-p)$ and p respectively. In fact, though, when the states $|\psi\rangle$ are not mutually orthogonal, the message will constitute a superposition of such strings, thus it is crucial that quantum coding protocols operate coherently over superpositions of different input strings. This is why we cannot compress the message simply by measuring each symbol in the eigenbasis and transmitting the (classical) result.

We can compress such messages through a procedure we call unary-to-binary coding. The basic idea of the scheme is to compress a string of k $|1\rangle$ 's and (N–k) $|0\rangle$ 's into k log N qubits by encoding the binary address of each of the k excitations (the $|1\rangle$ 's). For example, a message of the form (k=2 and N=8)

$$|0\rangle|0\rangle|1\rangle|0\rangle|0\rangle|0\rangle|1\rangle|0\rangle \quad (11)$$

can be compressed to k log N=6 qubits as $$|010\rangle|110\rangle, \quad (12)$$

where each group of three qubits specifies the address of an excitation. As previously mentioned, messages emitted by the source ρ may be composed of a superposition of such strings, each of which could have a different excitation number. To achieve near-lossless compression of such superpositions, we must specify some maximal number of excitations, $k_{max}$, such that with overwhelming probability all strings have fewer than $k_{max}$ excitations. Then, the message is compressed by encoding the binary addresses of up to $k_{max}$ excitations within each string. The coding scheme fails if any string in the superposition contains more than $k_{max}$ excitations. Since the expected number of expectations in a message is pN, one can choose $k_{max}$=pN(1+δ), and the failure probability can be arbitrarily suppressed by increasing the parameter δ. Therefore, unary-to-binary coding allows one to compress an N-qubit message to pN(1+δ) log N qubits, achieving a code rate of $$R = (1 + \delta)p\log N, \quad (13)$$

which can constitute a significant amount of compression for p<<1.

One drawback of this unary-to-binary coding scheme is the dependence of the code rate on the message length N, such that longer messages inevitably have increased compression rates. This problem can be solved by employing run-length excitation encoding, whereby the number of $|0\rangle$ 's between successive excitations is encoded rather than the positions of excitations themselves. For example, with a run-length encoding, the message may be encoded as $$|10\rangle|11\rangle, \quad (14)$$

indicating that there are two $|0\rangle$ 's between the start of the message and the first $|1\rangle$ and three $|0\rangle$ 's between the first and second $|1\rangle$ 's. In this example, we have used b=2 bits to encode the length of each run, and the scheme fails if any runs longer than $2^b$ bits are encountered. Since the expected length of a run is 1/p, in embodiments b=1/p(1+δ') to achieve a vanishing failure probability. This run-length encoding scheme thus achieves a compression rate of

10

$$R = -(1 + \delta)p\log p, \quad (15)$$

with vanishing error for sufficiently large δ (we have redefined to include the contribution from δ'). For small p, this rate matches the scaling of the dominant term of the binary entropy H(p<<1)≈−p log p, so the scheme achieves near-optimal compression rates in this regime.

3.1.2 QSN Implementation

We now describe how unary-to-binary coding and run-length coding can be implemented using QSNs. Algorithm 1, shown below, in an example of a unary-to-binary coding algorithm, shown schematically in FIG. 5.

| Algorithm 1: Unary-to-binary coding |
|---|
| 1   Sort (input nodes): {address, data} by {data} |
| 2    \| Copy addresses of first $k_{max}$ input nodes into corresponding output nodes |
| 3   Unsort (input nodes): {address, data} by {data} |
| 4   Sort (all nodes): {data, addresses} by {address} |
| 5    \| Apply CNOTs between adjacent nodes to erase data; |
| 6   Unsort (all nodes): {address, data} by {address} |
| 7   Discard input nodes; |

During the first stage of Algorithm 1 (lines 1-3), the addresses of $k_{max}$ excitations are copied into the state of a ($k_{max}$ log N)-qubit output register. This copying is performed as follows. In this example, each of the N symbols of the message are stored in a separate node of the QSN architecture (line 1). We refer to these N nodes as the message nodes. Also in this example, additional $k_{max}$ nodes (referred to as the output nodes) are available to hold the output, so that in total the architecture includes N+$k_{max}$ nodes. Let $|\psi_i\rangle$ denote the $i^{th}$ symbol of the message (i.e., the $i^{th}$ emission from ρ). At the $i^{th}$ message node, this symbol is appended to an additional (log N)-qubit register prepared in the state $|i\rangle$, so that the initial state of the $i^{th}$ node is $|\psi_i i\rangle$. The states of the message nodes are then sorted lexicographically, such that all states with $|\psi_i\rangle$ =$|1\rangle$ are sorted ahead of those with $|\psi_i\rangle$ −$|0\rangle$. At each of the first $k_{max}$ message nodes, the address information is copied into a corresponding output node via CNOTs. (When the first $k_{max}$ message nodes are not directly connected to the corresponding output nodes in the graph G, their states can be brought adjacent to one another by sorting according to a known classical permutation. Hence, this copying can be performed in depth O ($D_G$).) Finally, the sorting operation is reversed, returning the message nodes to their initial states (line 3).

During the second stage of Algorithm 1 (lines 4-7), the information in the output nodes is used to erase the original message so that the output is disentangled from the rest of the system. To do so, each of the message nodes are prepared in the state $|i, \psi_i\rangle$ similarly to before. At each output node, a single qubit in the state $|1\rangle$ is appended to the register already holding an excitation address, so that the initial state is of the form $|a_j, 1\rangle$, where $a_j$ denotes the address of the $j^{th}$ excitation. The joint system of (N+$k_{max}$) nodes is sorted lexicographically according to the addresses, such that states $|i, \psi_i\rangle$ and $|a_j, 1\rangle$ are placed adjacent to one another for $a_j$=i (line 4). Performing CNOTs between adjacent nodes then suffices to erase the excitations in the message (line 5). Finally, the system is unsorted (line 6), and the message nodes may be discarded (line 7).

Figure 5:
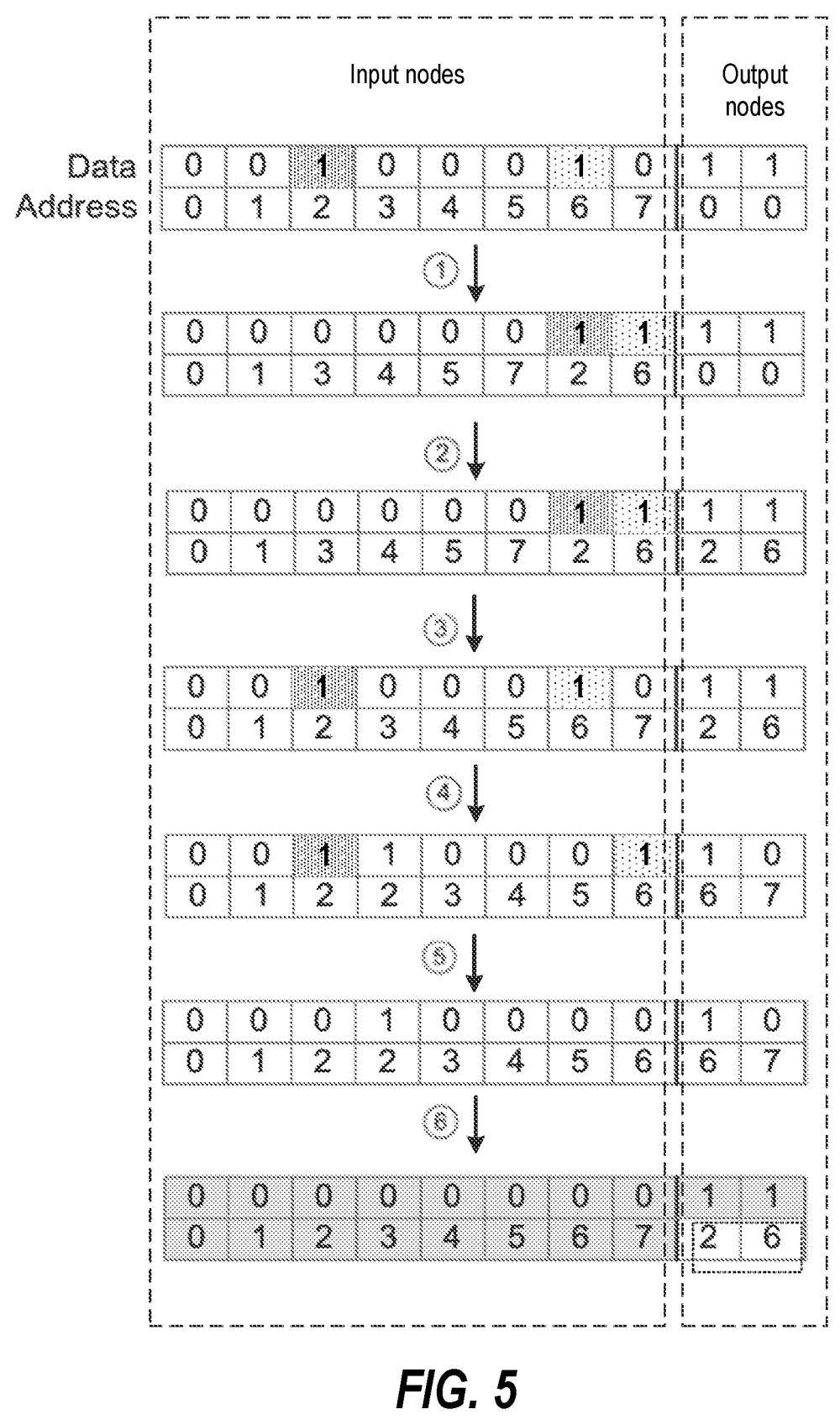

In one example of how to perform CNOTs between adjacent nodes, between lines 3 and 4 of Algorithm 1, an extra ancillary qubit may be added to each node, where this ancillary qubit is initialized in $|0\rangle$ for each of the input nodes and $|1\rangle$ for each of the output nodes. Then, during the subsequent sorting performed in line 4, each extra ancillary qubit may be regarded as an additional address qubit used to implement two-level sorting, where the address is used for the first level and the extra ancillary qubits are used for the second level. For example, when an input node is compared to an output node of the same address (e.g., $|6\rangle$), the input node (with its extra ancillary qubit in the state $|0\rangle$) will be sorted before the output node (with its extra ancillary qubit in the state $|1\rangle$) such that $|6,0\rangle$ comes before $|6,1\rangle$. This ensures that when an input and output node have the same address, the input node will always wind up to the left of, or before, the corresponding output node (as shown in FIG. 5).

With these extra ancillary qubits, CNOT gates may then be applied as follows: a set of CNOT gates are performed with the ancillary qubit of an even node $j$ acting as the control, and the data qubit of the odd node $j-1$ acting as the target. Then a set of CNOTs are performed with the ancillary qubit of an odd node $j-1$ acting as the control and the data qubit of the even node $j-2$ acting as the target. This step erases the excitations in the original message.

After the CNOT gates, the nodes may be unsorted according to the address registers, again regarding the ancillary qubits as an extra bit of the address. After this unsorting, all ancillary qubits in the input nodes are again in the state $|0\rangle$ and all of the ancillary qubits in the output nodes are again in the state $|1\rangle$. The extra ancillary qubits may then be discarded or disregarded.

Algorithm 1 can be performed in circuit depth $O(D_G)$, where $D_G$ is the minimum depth of the sorting network supported by the architecture's connectivity graph G. For sufficiently well-connected graphs, like the hypercube graph, $D_G = O(\log^2 N)$, so the protocol has only polylogarithmic depth.

To subsequently achieve better compression rates, the run-length encoding described above may implemented by simply computing the difference between each adjacent pair of addresses. This can be done reversibly, and the original addresses may be uncomputed after.

3.1.3. Decoding

In the preceding description of unary-to-binary coding, Algorithm 1 performs encoding. However, all of the quantum circuits used to implement Algorithm 1 perform unitary operations that can be operated in reverse. Therefore, it will be apparent to those trained in the art that the steps of Algorithm 1 can be performed in the reverse order to perform unary-to-binary decoding (or, equivalent, binary-to-unary encoding). The present embodiments include such unary-to-binary decoding.

In some embodiments, unary-to-binary encoding is performed without unary-to-binary decoding. For example, a quantum data center may be used to perform unary-to-binary encoding on an unary-encoded message to obtain a binary-encoded message. This binary-encoded message may then be transmitted to a third party that performs decoding to recover the original unary-encoded message.

In other embodiments, unary-to-binary decoding is performed without unary-to-binary encoding. For example, binary-encoded message may be received from a third party. Unary-to-binary decoding may then be performed on the received message to recover the original unary-encoded message.

3.2 Variable-Length Coding

We now consider the task of quantum source coding in full generality: the source $\rho$ emits d-dimensional states $|\psi_y$ $\rangle \in \mathbb{C}^d$ according to an arbitrary distribution $p_Y(y)$, and we seek to compress messages at a rate approaching the Von Neumann entropy. This Schumacher coding may be accomplished using QSNs with the aid of variable-length codes.

3.2.1 Coding Scheme

In variable-length quantum coding, each eigenstate $|\psi_x\rangle$ of $\rho$ is identified with a classical code word $w_x$ comprising $L_x$ bits. Let $L_{max}$ denote the length of the longest code word and $\bar{L}$ the average length of a code word. Coding begins by first performing a unitary encoding operation on each symbol, $$|\psi_x\rangle \to |w_x 0 \ldots 0\rangle |L_x\rangle, \tag{16}$$

where the first register on the right comprises $L_{max}$ qubits with the last $L_{max}-L_x$ qubits set to $|0\rangle$, and the second register comprises $\log L_{max}$ qubits. (When the words $w_x$ correspond to a classical prefix code, this encoding is redundant, in that the length $L_x$ information is already implicitly contained in the code word $w_x$. However, the explicit length information is helpful in enabling a QSN implementations, so we keep this potentially redundant information.) After this initial encoding step, coding proceeds by "merging" code words together, e.g., $$|w_{x_1} 0 \ldots 0\rangle |w_{x_2} 0 \ldots 0\rangle |w_{x_3} 0 \ldots 0\rangle |L_{x_1}\rangle |L_{x_2}\rangle |L_{x_3}\rangle \to |w_{x_1} w_{x_2} w_{x_3} 0 \ldots 0\rangle \tag{17}$$
$$|L_{x_1}\rangle |L_{x_2}\rangle |L_{x_3}\rangle$$

Compression is achieved by keeping only the first $N\bar{L}(1+\delta)$ qubits in the merged register, discarding the others, e.g., $$|w_{x_1} w_{x_2} w_{x_3} 0 \ldots 0\rangle |L_{x_1}\rangle |L_{x_2}\rangle |L_{x_3}\rangle \to |w_{x_1} w_{x_2} w_{x_3}\rangle |L_{x_1}\rangle |L_{x_2}\rangle |L_{x_3}\rangle. \tag{18}$$

By the law of large numbers, the error incurred in this truncation vanishes as $N$ increases.

This scheme achieves a compression rate of $$R = \bar{L}(1 + \delta) + \log L_{max}. \tag{19}$$

There exist classical variable-length codes, e.g., Huffman codes, for which the average code word length can be bounded to within a bit of the entropy, so the compression rate satisfies $$S(\rho)(1 + \delta) + \log L_{max} \le R \le (S(\rho) + 1)(1 + \delta) + \log L_{max}. \tag{20}$$

In many situations, the entropy will dominate the compression rate, such that the $\log L_{max}$ contribution will be negligible in comparison, and this coding scheme can reasonably be said to approach the Schumacher limit. The compression rate may be further improved by using a classical code which is not a prefix-free code (because the length information is already stored, the prefix-free property is not required for decoding): non-prefix codes allow for smaller $L_{max}$ such that the rate can be brought closer to the Schumacher limit.

3.2.2 QSN Implementation

The first step in source coding with a variable-length code is to implement the encoding operation (18). This encoding can be accomplished using QSNs, which can be used to perform parallel quantum queries to a classical data set. In the example of this section, the eigenstates $|\psi_x\rangle$ are used to index a classical memory storing the classical codewords $w_x$ and their lengths $L_x$. Hence, operation (23) can be implemented.

$$|\psi_x\rangle \rightarrow |\psi_x\rangle|w_x0...0\rangle|L_x\rangle \qquad (21)$$

Eigenstates $|\psi_x\rangle$ may be erased by using the code words and their lengths to index a classical memory containing the classical bit strings $\psi_x$, $$|\psi_x\rangle|w_x0...0\rangle|L_x\rangle \rightarrow |w_x0...0\rangle|L_x\rangle. \qquad (22)$$

As described in Ref. 11, these operations can be performed in depth $O(D_G)$. We emphasize that this encoding operation is unitary because there is a one-to-one mapping between eigenstates and their codewords.

| Algorithm 2: Variable-length coding | |
|---|---|
| 1 | Format length registers |
| 2 | Sort: {length, address, data} by {length, address} |
| 3 | Unsort: {length, address} by {length, address} |
| 4 | Unformat length registers |
| 5 | Discard last N − k nodes |

Figure 6:
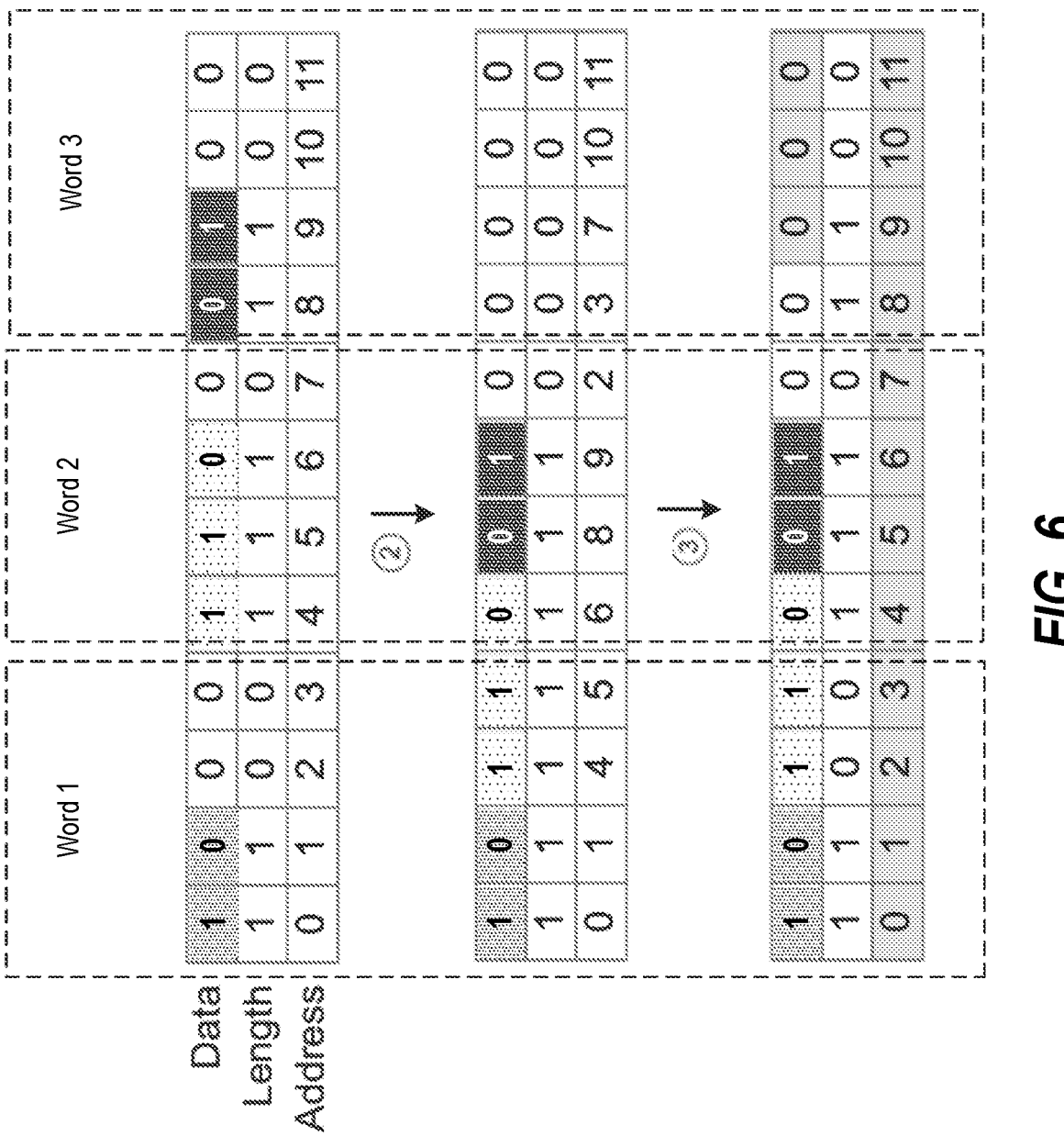
FIG. 6 is a schematic of a variable-length coding algorithm, in an embodiment.

FIG. 6 is a schematic of a variable-length coding algorithm, shown above as Algorithm 2. Compression is accomplished via a single sort of the data conditioned on the state of the length registers.

Once the encoding is completed, the data may be merged in order to complete the compression procedure. Our QSN implementation of this merging procedure is illustrated in FIG. 6. The procedure begins by formatting the code word length information as $|L_x\rangle \rightarrow |l_x\rangle$, where as before $|L_x\rangle$ denotes a log $L_{max}$-qubit register prepared in state $L_x$, and $|l_x\rangle$ denotes an $L_{max}$-qubit register with the first $L_x$ qubits in $|1\rangle$ and the remaining qubits in $|0\rangle$. For example, $$|L_x\rangle = |101\rangle \rightarrow |l_x\rangle = |11111000\rangle. \qquad (23)$$

With this formatting, there are $NL_{max}$ qubits, and we assign each to a node of the QSN architecture. A log $(NL_{max})$-qubit address register is appended to each, and the states are sorted. This sort effects a permutation that would merge the code words as in Eqn. 17, and this permutation may be applied to the message by sending the message through the same sorting network with its already-initialized controls. Subsequently, an inverse sort may be performed, and the formatting is reversed to return the length information to its initial state. The merged data and length information constitute the compressed representation, while all other registers are discarded.

3.2.3. Decoding

In the preceding description of variable-length coding, Algorithm 2 performs encoding. However, all of the quantum circuits used to implement Algorithm 2 perform unitary operations that can be operated in reverse. Therefore, it will be apparent to those trained in the art that the steps of Algorithm 2 can be performed in the reverse order to perform variable-length decoding. The present embodiments include such variable-length decoding.

In some embodiments, variable-length encoding is performed without variable-length decoding. For example, a quantum data center may be used to perform variable-length encoding on an unencoded message to obtain a variable-length-encoded message. This variable-length-encoded message may then be transmitted to a third party that performs decoding to recover the original unencoded message.

In other embodiments, variable-length decoding is performed without variable-length encoding. For example, a variable-length-encoded message may be received from a third party. Variable-length decoding may then be performed on the received message to recover the original unencoded message.

3.3 Universal Source Coding

The source $\rho$ is known in the above coding protocols. In practice, however, one may wish to compress messages generated by an unknown source $\rho$. A protocol that compresses messages for arbitrary, unknown $\rho$ referred to as universal source coding, and in this section, we describe how universal source coding can be implemented with QSNs.

Universal source coding may be implemented via a two-step protocol. In the first step includes measuring message to obtain an estimate of $\rho$. The second step includes application of a compression scheme (like those described in the previous sections) that is tailored to the estimate of $\rho$. It is crucial that the measurements in the first stage be "gentle" in the sense that they should not result in significant back action that could corrupt the message. To realize such a measurement, we employ the "gentle tomography" scheme. We first summarize this scheme in the abstract, then show how it can be implemented with QSNs.

3.3.1 Gentle Tomography

We consider a message composed of N emissions $|\psi_x\rangle$ from an unknown source $\rho$. While we could directly measure a subset of these states to estimate $\rho$, this is necessarily destructive. Without knowledge of $\rho$'s eigenbasis, measuring $|\psi_x\rangle$ will result in undesired backaction on the state. To avoid this backaction, we instead perform weak collective measurements on the entire message. These collective measurements are based on generalized excitation number measurements. Consider a measurement described by the operators $$M_k = \sum_{x\in\{0,1\}^N, |x|=k} \bigotimes_{i=1}^{N}(x_i|0\rangle\langle0|+(1-x_i)|1\rangle\langle1|), \qquad (24)$$

where $M_k$ is the projector onto bitstrings with exactly k excitations. Measuring $\{M_k\}$ reveals the expectation value $\langle 1|\rho|1\rangle$. Moreover, other expectation values $\langle \phi|\rho|\phi\rangle$ can be easily estimated using the same measurement by first applying a global unitary operation $U^{\otimes N}$ to the message such that $U|1\rangle = |\phi\rangle$. Unfortunately, these sorts of measurements project the message into a definite excitation number, which again constitutes unwanted backaction.

A way to avoid this unwanted backaction is to perform binned excitation number measurements, defined by measurement operators $$M_j = \sum_{k \in bin_j} M_k. \tag{25}$$

Because the expected number of $|1\rangle$'s in a message will be approximately normally distributed about N $\langle\{1|\rho|1\rangle$, the backaction of this binned measurement is likely to be negligible when the bin widths are larger than the standard deviation. There is thus a tradeoff between information gained about $\rho$ and the backaction imparted to the message. The ability to perform binned excitation number measurements suffices to perform gentle tomography, which enables universal source coding.

3.3.2 QSN Implementation

Figure 7:
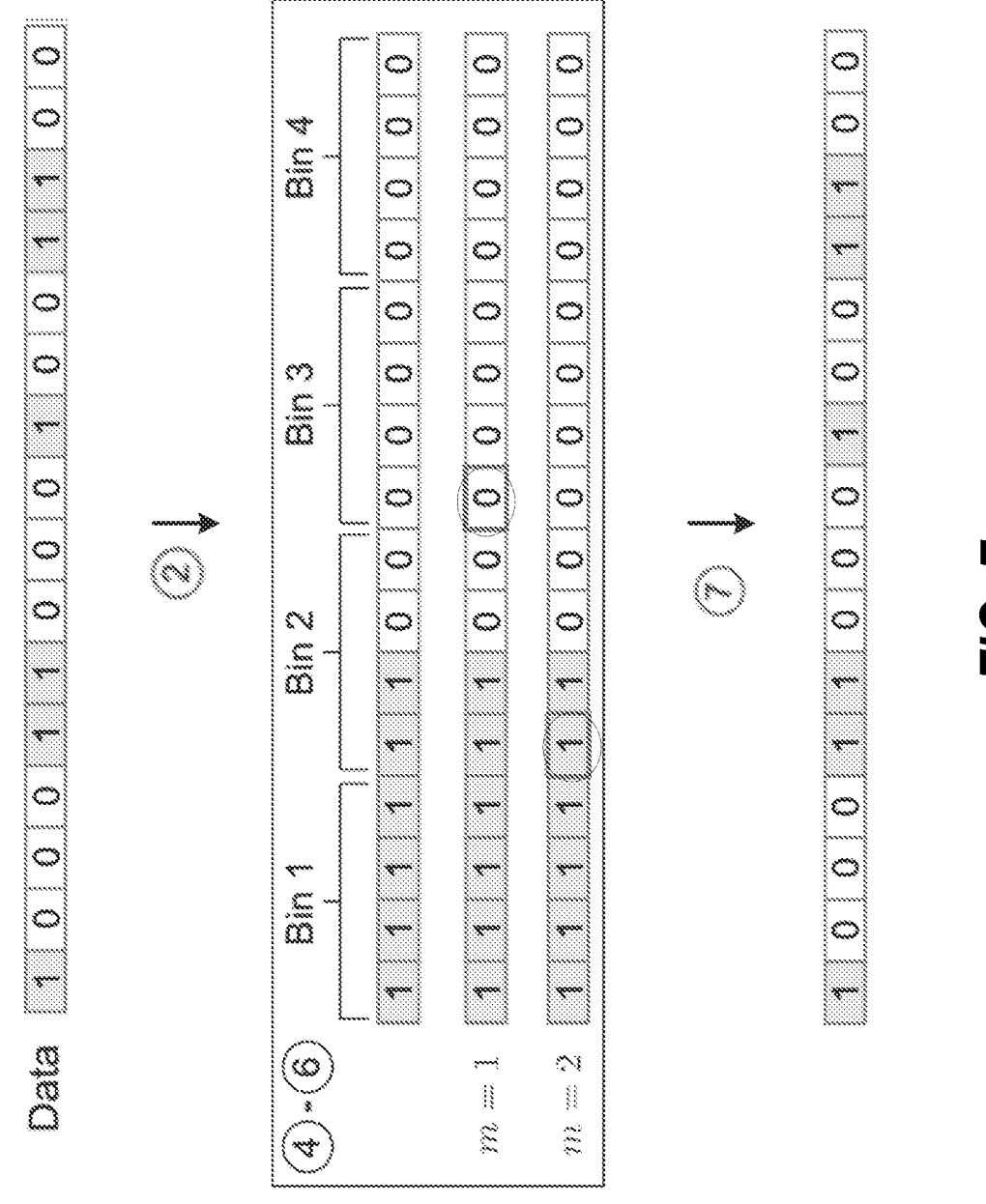
FIG. 7 depicts a gentle measurement procedure, in an embodiment.

FIG. 7 depicts a gentle measurement procedure 700, which is also shown in Algorithm 3 below. Procedure 700 and Algorithm 3 illustrate an example QSN implementation of gentle tomography. First, a global unitary operation is applied to select the basis for the binned excitation number measurement. Then, the data is sorted, which has the effect of placing all excitations adjacent to one another in the first k registers. Next a subset of these registers is measured in the computational basis: to determine the bin in which the excitation number lies, a binary search is performed by measuring qubits that lie at the bin boundaries. When the N registers are divided into M bins, the bin of the excitation number is revealed by measuring only log M measurements, which is optimal. For sufficiently wide bins, this measurement has negligible backaction, and unsorting returns the system to its initial state (approximately). Measurements in different bases may subsequently be performed to construct an estimate of $\rho$. We note that this same QSN implementation can be similarly used to implement so-called amplified measurements, useful for tomography.

---

| Algorithm 3: Gentle Tomography |
|---|
| 1    for U ∈ P do |
| 2        Apply $U^{\otimes N}$ to data |
| 3        Sort: {data} by {data} |
| 4        for m = 1; m ≤ log M; m ← m + 1 do |
| 5            Measure data qubit $q_m$ in computational basis, and set $b_m$ ← (measurement result) |
| 6        end |
| 7        Unsort: {data} by {data} |
| 8        Apply $(U^\dagger)^{\otimes N}$ to data |
| 9    end |

---

Additional details of gentle measurement procedure 500 are as follows. Initially (step 2 in FIG. 7), the data are sorted so that the total number of $|1\rangle$'s (six in this example) is encoded in the position of the rightmost $|1\rangle$ (the 6th node) in the sorted data. A binned measurement of this position is performed via a binary search (steps 4-6 in FIG. 7): a measurement (m=1) of the leftmost qubit in bin 3 reveals that the rightmost $|1\rangle$ lies in bin 1 or 2, and a subsequent measurement (m=2) of the leftmost qubit in bin 2 reveals that the rightmost $|1\rangle$ lies in bin 2. The data are unsorted after the measurements.

Together with the above QSN implementations of source coding (either unary-to-binary coding or variable-length coding), this QSN implementation of gentle tomography enables a QSN implementation of universal source coding.

4. Noise Resilience

For such protocols to be implemented in the near term, before fault-tolerant quantum computers with negligible logical error rates are available, it is crucial to understand how noise and decoherence affects the above protocols. In this section, we show that embodiments of QSN-based protocols disclosed herein are naturally resilient to certain kinds of noise, thus reducing the QEC overhead required to implement them with high fidelity. We begin first by defining an appropriate figure of merit for our schemes. Then, by analyzing how errors propagate through QSNs, we show that our protocols are resilient to noise according to this metric. More precisely, we show that the average qubit error rate due to dephasing errors scales only polylogarithmically with the message size, in contrast to the polynomial scaling that one would naively expect.

4.1 Qubit Error Rate

As an appropriate figure of merit for our compression schemes, we define the Qubit Error Rate (QER) as follows. Let $|\psi_i\rangle$ denote the $i^{th}$ state emitted from the source $\rho$. Suppose that a message of N such states is compressed then decompressed, yielding a final N-partite state $\Omega$. Denote the partial trace of $\Omega$ over all registers except the $i^{th}$ by $\sigma_i$. For truly lossless coding (where the message is perfectly preserved by the compression and decompression) we have $\sigma_i = |\psi_i\rangle\langle\psi_i|$. In practice, the coding may only be near-lossless, due either to errors or decoherence in the coding process, or to over-truncation of the compressed message. To quantify this information loss, we define the QER as $$QER = \frac{1}{N}\sum_{i=1}^{N}(1 - \langle\psi_i|\sigma_i|\psi_i\rangle). \tag{26}$$

Intuitively this quantity quantifies the average probability that a state $|\psi_i\rangle$ survives the compression and decompression processes. It is analogous to the bit error rate commonly used as a metric in classical communication. We note that, in the context of source coding, the QER is a more natural metric than the fidelity between the input and output N-state messages: a single error can reduce the latter metric to zero, even when the overwhelming majority of states are correctly transmitted. We thus focus on the QER in analysis.

In this section, we focus on how decoherence affects the QER. The natural expectation is that the QER scales as $$QER \sim \text{poly}(N). \tag{27}$$

Indeed, in the presence of a constant decoherence rate, any coding algorithms with polynomial run time (e.g., Refs. [2, 3, 5, 7, 8]) necessarily have this scaling, because the total probability that a qubit decoheres scales with the circuit (polynomial) depth. For algorithms with polylogarithmic run time (e.g., Ref. [4] and our QSN algorithms above), it is conceivable that one could have a much more favorable scaling, $$QER \sim polylog(N). \tag{28}$$

By itself, however, a logarithmic-depth coding scheme is not sufficient to guarantee such a scaling. In fact, during the course of a generic quantum algorithm, all N qubits involved are liable to be entangled, such that even a single error can propagate widely and quickly degrade the quality of the output state. Therefore, even for polylogarithmic depth coding schemes one would still typically expect the QER to scale polynomially. Below, we show that the propagation of certain kinds of errors through QSNs can be highly constrained such that our protocols achieve a favorable polylogarithmic scaling QER with respect to these errors. The task of using error correction suppress the remaining errors can then be far more resource efficient.

4.2 Noise-Resilient QSNs

To show that our QSN-based protocols are noise resilient in the above sense, we analyze how bit-flip and phase-flip errors propagate through quantum comparators. From these observations, we can deduce how errors propagate through QSNs and our coding schemes.

Figure 8:
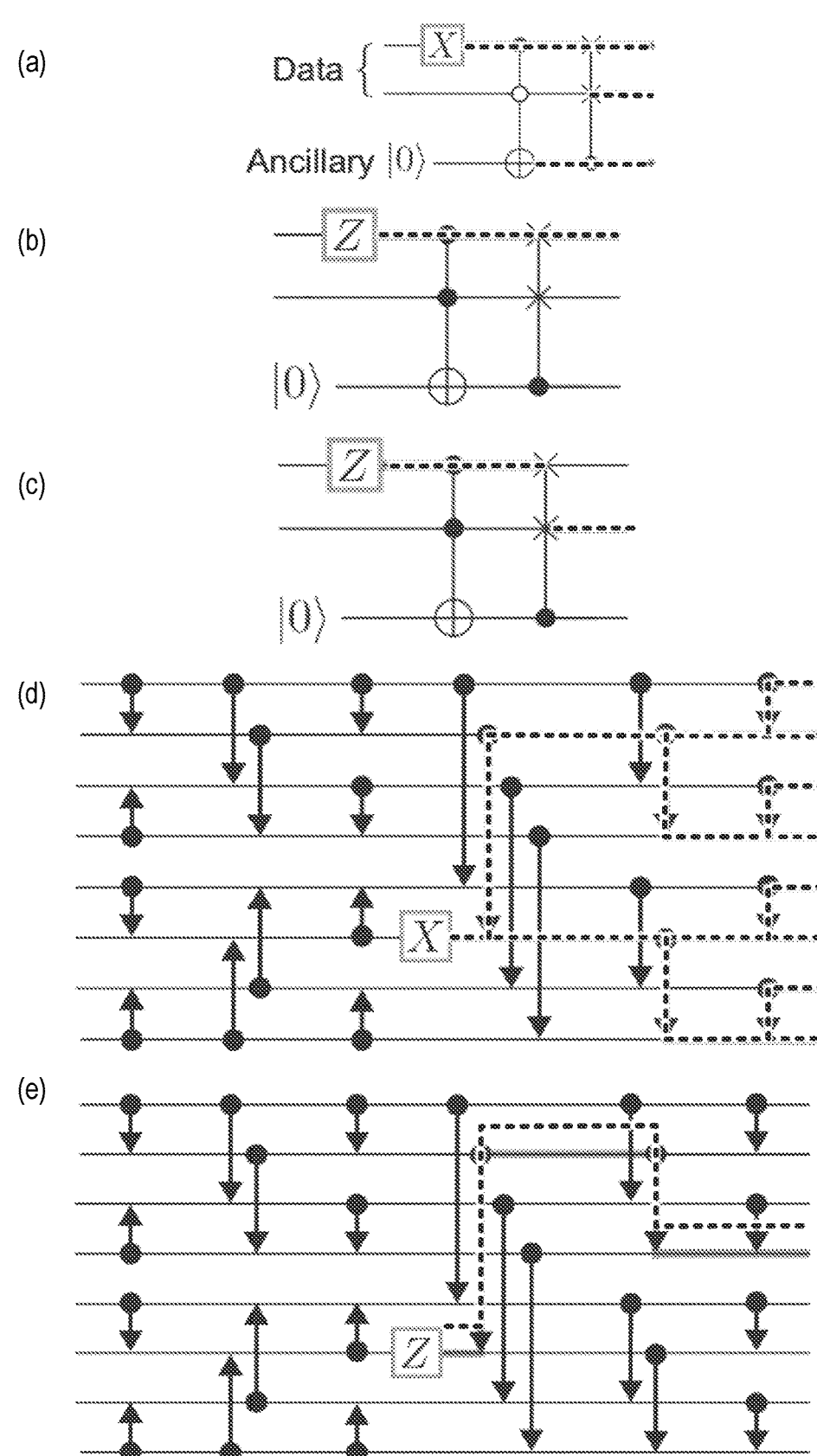
FIG. 8 shows propagation of X and Z errors through quantum comparators, in an embodiment.

The propagation of X and Z errors through quantum comparators is shown in FIG. 8, which includes panels (a)-(e). Panels (a)-(c) illustrate propagation of data errors through comparators. We consider the case where each data rail comprises only a single qubit, so that the comparison operation reduces to a generalized Toffoli gate. X errors in one of the data rails generally propagate to both data rails, as in panel (a). In contrast, Z errors in the data rails do not propagate. Depending on the outcome of the comparison, they either remain at the same rail, as in panel (b), are swapped to the other data rail, as in panel (c), or both possibilities occur in superposition. Regardless, the total number of Z errors does not increase, as shown in panels (d) and (e) Examples of the propagation of X and Z errors through quantum sorting networks. The propagation of Z errors in panel (e) is constrained as a result of the behavior in panels (b) and (c).

We distinguish errors according to whether they occur in the data (the states which are compared) or the control (the ancilla that records the result of the comparison and swaps the states accordingly). It suffices to consider only the propagation of errors from the data, since ancilla errors can only propagate to the rest of the circuit by first propagating to the data. As shown in panel (a), X errors in the data propagate in an unconstrained manner, corrupting other data registers. As shown in panel (b), however, Z errors in the data are constrained in their propagation: an initial Z error in the data does not propagate to additional Z errors in the other data or in the control, and the total number of Z errors is unchanged.

Taken together, these two observations imply that the propagation of Z errors in QSNs is constrained, as illustrated in panels (d) and (e) of FIG. 8. Though errors may propagate from a control to the corresponding data, the errors cannot subsequently propagate. Each Z error can thus propagate to at most a constant number of other Z errors. Given that there are $O(ND_G)$ possible Z error locations in the circuit, it follows that when all of the Z errors are propagated to the end of the circuit, the total number of such errors remains $O(ND_G)$.

In the context of source coding, it directly follows that the average probability of seeing a Z error in the final state $\sigma_i$, and hence the contribution to the QER from Z errors, scales as $O(D_G)$. For logarithmic-depth sorting networks, this yields a polylogarithmic scaling for the QER. Therefore, our QSN based source coding protocols are intrinsically resilient to Z errors.

Unfortunately, QSNs are not resilient to X errors. A generic X error can propagate to $O(N)$ other qubits, such that the QER due these errors scale polynomially with N. (Note that X errors can potentially propagate to linear combinations of X and Z errors.) Accordingly, to achieve a low QER, quantum error correction needs to be employed to suppress the X error rate. Provided the gates in the QSN is implemented fault tolerantly at the logical level, i.e., in a way that preserves the respective X and Z distances of the code, the total QER should then scale as $$QER \sim \epsilon_X^{(L)} \text{poly}(N) + \epsilon_Z^{(L)} polylog(N), \qquad (29)$$

where $$\epsilon_X^{(L)} \text{ and } \epsilon_Z^{(L)}$$

are the X and Z logical error rates. That is, fault tolerance guarantees that the resilience to Z errors persists at the logical level. As a result, the QEC hardware overhead can be reduced by choosing code that predominantly corrects X errors—such as a repetition code or thin strip surface code—in order to suppress the dominant term in the QER. Constructing logical qubits out of physical qubits with strongly biased noise provides another means to reduce the QEC overhead.

REFERENCES

[1] B. Schumacher, "Quantum coding," *Phys. Rev. A* 51 no. 4, (April 1995) 2738-2747.

[2] R. Jozsa, M. Horodecki, P. Horodecki, and R. Horodecki, "Universal Quantum Information Compression," *Phys. Rev. Lett.* 81 no. 8, (August 1998) 1714-1717, arXiv: quant-ph/9805017.

[3] R. Cleve and D. P. DiVincenzo, "Schumacher's quantum data compression as a quantum computation," *Phys. Rev. A* 54 no. 4, (October 1996) 2636-2650.

[4] S. Braunstein, C. Fuchs, D. Gottesman, and Hoi-Kwong Lo, "A quantum analog of Huffman coding," *IEEE Trans. Inf. Theory* 46 no. 4, (July 2000) 1644-1649.

[5] I. Chuang and D. Modha, "Reversible arithmetic coding for quantum data compression," *IEEE Trans. Inf. Theory* 46 no. 3, (May 2000) 1104-1116.

[6] B. Schumacher and M. D. Westmoreland, "Indeterminate-length quantum coding," *Phys. Rev. A* 64 no. 4, (September 2001) 042304.

[7] M. Hayashi and K. Matsumoto, "Quantum universal variable-length source coding," *Phys. Rev. A* 66 no. 2, (August 2002).

[8] R. Jozsa and S. Presnell, "Universal quantum information compression and degrees of prior knowledge," *Proc. R. Soc. Lond. Ser. Math. Phys. Eng. Sci.* 459 no. 2040, (December 2003) 3061-3077.

[9] J. Langford, "Generic quantum block compression," *Phys. Rev. A* 65 no. 5, (2002) 052312.

[10] S.-T. Cheng and C.-Y. Wang, "Quantum switching and quantum merge sorting," *IEEE Trans. Circuits Syst. Regul. Pap.* 53 no. 2, (February 2006) 316-325.

[11] R. Beals, S. Brierley, O. Gray, A. W. Harrow, S. Kutin, N. Linden, D. Shepherd, and M. Stather, "Efficient distributed quantum computing," *Proc. R. Soc. Math. Phys. Eng. Sci.* 469 no. 2153, (May 2013) 20120686.

[12] D. W. Berry, M. Kieferová, A. Scherer, Y. R. Sanders, G. H. Low, N. Wiebe, C. Gidney, and R. Babbush, "Improved techniques for preparing eigenstates of fermionic Hamiltonians," *Npj Quantum Inf.* 4 no. 1, (May 2018) 1-7.

[13] K. Bostroem and T. Felbinger, "Lossless quantum data compression and variable-length coding," *Phys. Rev. A* 65 no. 3, (February 2002) 032313.

[14] C. H. Bennett, A. W. Harrow, and S. Lloyd, "Universal quantum data compression via nondestructive tomography," *Phys. Rev. A* 73 no. 3, (March 2006).

[15] S. Aaronson, "Shadow Tomography of Quantum States," *SIAM J. Comput.* 49 no. 5, (January 2020) STOC18-368.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated, the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A method for quantum source coding, comprising:

initializing a quantum register having a plurality of nodes, wherein:

each of the plurality of nodes includes a data register and an address register, each of the data register and address register having one or more qubits;

the plurality of nodes is coupled to each other to support a reversible quantum sorting network;

the plurality of nodes is partitioned into message nodes and output nodes; and said initializing includes (i) initializing each of the one or more qubits of the data register of each of the message nodes to a first computational basis state and (ii) initializing each of the one or more qubits of the data register of each of the output nodes to a second computational basis state that is orthogonal to the first computational basis state;

loading a unary-coded message into the quantum register, wherein:

the unary-coded message comprises an input sequence of symbols, each symbol of the input sequence being a two-dimensional quantum state; and said loading comprises storing each symbol in the data register of a respective one of the message nodes;

loading an address state into the address register of each of the message nodes, the address state indexing each symbol such that the message nodes form an initial sequence in one-to-one correspondence with the input sequence; and sorting, with the reversible quantum sorting network, the message nodes based on the data register such that the message nodes form a message-sorted sequence;

applying, for each message node of one or more of the message nodes located at an end of the message-sorted sequence, a CNOT gate to the address state of said each message node and the address state of a respective one of the output nodes;

unsorting, with the reversible quantum sorting network, the message nodes to return the message-sorted sequence to the initial sequence;

sorting, with the reversible quantum sorting network, the plurality of nodes based on the address register such that the plurality of nodes forms a fully-sorted sequence;

applying, for each pair of adjacent nodes in the fully-sorted sequence having the same address state, a CNOT gate to the data registers of said each pair; and unsorting, with the reversible quantum sorting network, the plurality of nodes to return the fully-sorted sequence to the initial sequence;

wherein the address registers of the output states, after said unsorting the plurality of nodes, store a binary-coded message corresponding to the unary-coded message.

2. The method of claim 1, further comprising transmitting, after said unsorting the plurality of nodes, the binary-coded message.

3. The method of claim 1, wherein:

said sorting the message nodes includes processing a plurality of ancilla qubits to track swap operations performed by a plurality of quantum swap gates, of the reversible quantum sorting network, during said sorting the message nodes, each of the plurality of ancilla qubits being associated with a respective one of the plurality of quantum swap gates;

said unsorting the message nodes uses the plurality of ancilla qubits;

said sorting the plurality of nodes includes processing the plurality of ancilla qubits to track swap operations performed by the plurality of quantum swap gates during said sorting the plurality of nodes; and said unsorting the plurality of nodes uses the plurality of ancilla qubits.

4. The method of claim 1, further comprising coupling the plurality of nodes to each other according to a hypercube graph.

5. The method of claim 1, at least one of the symbols being a superposition of the first and second computational basis states.

6. A system for quantum source coding, comprising a quantum computer operable to perform the method of claim 1.

7. A method for quantum source coding, comprising:

initializing a quantum register having a plurality of nodes, wherein:

each of the plurality of nodes includes a data register and an address register, each of the data register and address register having one or more qubits;

the plurality of nodes is coupled to each other to support a reversible quantum sorting network;

the plurality of nodes is partitioned into input nodes and message nodes; and said initializing includes (i) initializing each of the one or more qubits of the data register of each of the message nodes to a first computational basis state and (ii) initializing each of the one or more qubits of the data register of each of the input nodes to a second computational basis state that is orthogonal to the first computational basis state;

loading a binary-coded message into the quantum register, wherein:

the binary-coded message comprises an input sequence of binary-coded address states; and said loading comprises loading each binary-coded address state of the input sequence into the address register of a respective one of the input nodes;

loading an address state into the address register of each of the message nodes, the address state indexing said each of the message nodes such that the message nodes form an initial sequence;

sorting, with the reversible quantum sorting network, the plurality of nodes based on the address register such that the plurality of nodes forms a fully-sorted sequence;

applying, for each pair of adjacent nodes in the fully-sorted sequence having the same address state, a CNOT gate to the data registers of said each pair;

unsorting, with the reversible quantum sorting network, the plurality of nodes to return the fully-sorted sequence to the initial sequence;

sorting, with the reversible quantum sorting network, the message nodes based on the data register such that the message nodes form a message-sorted sequence;

applying, for each message node of one or more of the message nodes located at an end of the message-sorted sequence, a CNOT gate to the address state of said each message node and the address state of a respective one of the input nodes; and unsorting, with the reversible quantum sorting network, the message nodes to return the message-sorted sequence to the initial sequence;

wherein the data registers of the message nodes, after said unsorting the message nodes, store a unary-coded message corresponding to the binary-coded message.

8. The method of claim 7, further comprising transmitting the unary-coded message.

9. The method of claim 7, wherein:

said sorting the plurality of nodes includes processing a plurality of ancilla qubits to track swap operations performed by a plurality of quantum swap gates, of the reversible quantum sorting network, during said sorting the plurality of nodes, each of the plurality of ancilla qubits being associated with a respective one of the plurality of quantum swap gates;

said unsorting the plurality of nodes uses the plurality of ancilla qubits;

said sorting the message nodes includes processing the plurality of ancilla qubits to track swap operations performed by the plurality of quantum swap gates during said sorting the message nodes; and said unsorting the message nodes uses the plurality of ancilla qubits.

10. The method of claim 7, further comprising coupling the plurality of nodes to each other according to a hypercube graph.

11. The method of claim 7, at least one of the data states being a superposition of the first and second computational basis states.

12. A system for quantum source coding, comprising a quantum computer operable to perform the method of claim 7.

13. A method for quantum source coding, comprising:

initializing a quantum register having a plurality of nodes partitioned into codeword blocks having an identical number of the plurality of nodes, wherein:

each of the plurality of nodes includes a data register, a length register, and an address register, each of the data register, length register, and address register having one or more qubits;

the data registers of the plurality of nodes in each codeword block, of the plurality of codeword blocks, form a data sub-block;

the length registers of the plurality of nodes in each codeword block form a length sub-block;

the address registers of the plurality of nodes in each codeword block form an address sub-block; and the plurality of nodes is coupled to each other to support a reversible quantum sorting network;

loading a message into the quantum register, the message comprising an input sequence of symbols, each symbol of the input sequence being a quantum state in $d \geq 2$ dimensions, wherein said loading the message includes:

performing, with the reversible quantum sorting network, a parallel query of a codebook to retrieve a codeword state and a binary-coded length state corresponding to each symbol, each of the codeword state and the binary-coded length state being disentangled from said each symbol;

loading the codeword state into the data sub-block of a respective one of the codeword blocks;

formatting the binary-coded length state into a unary-coded length state; and loading the unary-coded length state into the length sub-block of the respective one of the codeword blocks;

loading an address state into the address register of each node of the plurality of nodes, the address state indexing said each node such that the plurality of nodes form an initial-node sequence;

sorting, with the reversible quantum sorting network, the plurality of nodes into a sorted-node sequence, wherein a first level of said sorting is based on the length registers and a second level of said sorting is based on the address registers; and unsorting, with the reversible quantum sorting network, the address registers and the length registers such that the address registers and the length registers are ordered according to the initial-node sequence while the data registers remain ordered according to the sorted-node sequence;

wherein after said unsorting (i) the data registers store a sequence of compressed codeword states followed by a sequence of padding states and (ii) the length registers store a sequence of unary-coded length states.

14. The method of claim 13, further comprising transmitting, after said unsorting, the sequence of compressed codeword states and the sequence of unary-coded length states.

15. The method of claim 13, further comprising unformatting the unary-coded length state of each codeword block back into its binary-coded length state;

wherein the length registers, after said unformatting, store a sequence of binary-coded length states.

16. The method of claim 15, further comprising transmitting, after said unformatting, the sequence of compressed codeword states and the sequence of binary-coded length states.

17. The method of claim 13, wherein:

said sorting includes processing a plurality of ancilla qubits to track swap operations performed by a plurality of quantum swap gates, of the reversible quantum sorting network, during said sorting, each of the plurality of ancilla qubits being associated with a respective one of the plurality of quantum swap gates; and said unsorting uses the plurality of ancilla qubits.

18. The method of claim 13, wherein:

each codeword state is an eigenstate of a density matrix; and at least one of the symbols is in a superposition of two or more eigenstates of the density matrix.

19. The method of claim 13, further comprising coupling the plurality of nodes to each other according to a hypercube graph.

20. A system for quantum source coding, comprising a quantum computer operable to perform the method of claim 13.

\* \* \* \* \*